Patented Apr. 18, 1944

2,347,042

UNITED STATES PATENT OFFICE 2,347,042

1-ARYLAMINO-5-HYDROXYNAPHTHALENE-7-SULPHONIC ACID

Richard Fleischhauer and Adolf Müller, Frankfort-on-the-Main-Fechenheim, Germany, assignors to General Aniline & Film Corporation, New York, N. Y., a corporation of Delaware No Drawing. Application May 20, 1941, Serial No. 394,284. In Germany May 21, 1940

4 Claims. (Cl. 260—507)

Our present invention relates to 1-arylamino-5-hydroxynaphthalene-7-sulphonic acids of the general formula:

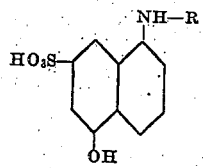

wherein R stands for a radicle of the group consisting of the benzene and naphthalene series, which are new compounds, hitherto unknown in literature. They are obtainable by acting with primary amines of the general formula R—NH$_2$, wherein R has the aforesaid signification in the presence of salts thereof on the 1-amino-5-hydroxynaphthalene-7-sulphonic acid at temperatures above 130° preferably ranging from 150 to 170°, advantageously in a closed vessel in the presence of water. The addition of benzoic acid may be a further advantage.

In this manner the new compounds are obtainable with a good yield and without the formation of amounts of decomposition products that are worth mentioning. This fact is very surprising, since the 1-amino-5-hydroxynaphthalene-7-sulphonic acid as such is easily oxidizable and the same process is applicable on isomeric and analogous starting materials only at lower temperatures, whereas at temperatures above 130° large quantities of undesired products of decomposition are formed.

The present process may be varied by starting from the 1-naphthylamine-5.7-disulphonic acid and reacting thereupon with the primary amines, advantageously in the presence of salts thereof. The hitherto unknown 1-arylaminonaphthalene-5.7-disulphonic acids, formed thereby with a good yield, are then transformed into the 1-arylaminonaphthalene-5-hydroxy-7-sulphonic acids by the fusion with caustic alkalies.

Another method of producing the present reaction products consists in acting at higher temperatures preferably ranging from 100 to 150° with the primary aminocompounds in the presence of salts of sulphurous acid on 1-amino-5-hydroxynaphthalene-7-sulphonic acid, or 1.5-dihydroxy-naphthalene-7-sulphonic acid or salts thereof. This method allows starting from easily oxidizable amino-compounds such as aromatic diamino- or aminohydroxycompounds moreover from aminocompounds containing a solubilizing group such as a carboxylic or sulphonic acid group. An alternative method consists in decomposing the sulphurous acid ester of 1.5-dihydroxy-naphthalene-7-sulphonic acid by means of the aforesaid primary amines. The present 1-arylamino-5-hydroxy-naphthalene-7-sulphonic acids are when dry colorless to slightly reddish to greenish gray powders, easily soluble in alkaline solutions and mostly soluble in hot water. Their alkali metal salts are easily soluble in water and can be isolated therefrom in most cases by adding salt thereto. They are valuable intermediates for the production of dyestuffs, particularly of azodyestuffs.

In order to further illustrate our invention the following examples are given, the parts being by weight and all temperatures in degrees centigrade.

Example 1

A mixture of 239 parts of 1-amino-5-hydroxynaphthalene-7-sulphonic acid, 500 parts of aniline, 125 parts of hydrochloric acid of 1.160 density and about 500 parts of water is heated in a closed vessel for 12 to 15 hours at 150 to 160°. After the addition of 60 parts of sodium hydroxide the aniline is distilled off with steam. From the remaining liquor, which has been filtered, the sodium salt of 1-phenylamino-5-hydroxynaphthalene-7-sulphonic acid of the formula:

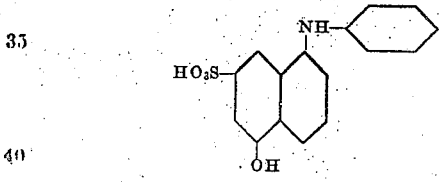

separates after the addition of salt. It crystallizes as small nearly colorless needles. The yield is good.

When heating a mixture of 239 parts of 1-amino-5-hydroxynaphthalene-7-sulphonic acid, 400 parts of aniline and 140 parts of aniline hydrochloride in an open vessel provided with a refrigerator while stirring at 150 to 155° the same 1-phenylamino-5-hydroxynaphthalene-7-sulphonic acid is obtained in a good yield.

When heating in an autoclave as described above a mixture of 1-amino-5-hydroxynaphthalene-7-sulphonic acid, hydrochloric acid, water and the equivalent amount of 4-methoxy-1-aminobenzene 1-(4'-methoxyphenylamino)-5-hydroxynaphthalene-7-sulphonic acid of the formula:

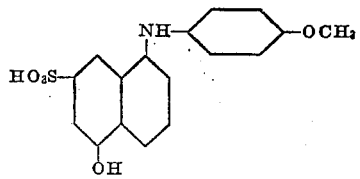

is obtained in a very good yield. Its sodium salt crystallizes as slightly greenish leaflets.

When acting in the same manner with 4-methyl-1-aminobenzene there is obtained an excellent yield of 1-(4'-methylphenyl) amino-5-hydroxynaphthalene-7-sulphonic acid of the formula:

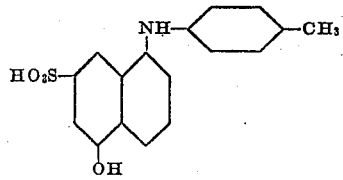

which is advantageously isolated in the form of the free acid, the sodium salt being too easily oxidizable.

*Example 2*

A mixture of 261 parts of the sodium salt of 1-amino-5-hydroxynaphthalene-7-sulphonic acid, 1100 parts of a sodium-bisulphite solution of 1.333 density and 500 parts of aniline is heated in an autoclave for about 40 hours at 130 to 133°. After the addition of sodium carbonate until an apparently alkaline reaction the excess of aniline is removed by steam distillation and after the addition of sodium chloride and cooling the aforesaid sodium salt of the 1-phenylamino-5-hydroxynaphthalene-7-sulphonic acid separates. It is isolated as described in the foregoing example.

*Example 3*

A mixture of 325 parts of the monosodium salt of 1-aminonaphthalene-5.7-disulphonic acid, 400 parts of aniline and 140 parts of aniline hydrochloride is heated for about 24 hours at about 160 to 170°. After neutralisation with a caustic soda solution the excess of aniline is removed by steam distillation and the remaining liquor is purified by filtration. By adding sodium chloride to the solution the disodium salt of the 1-phenylaminonaphthalene-5.7-disulphonic acid is obtained as a slightly yellowish powder in a good yield.

423 parts of this salt are added slowly at 170 to 175° to a mixture of 1500 parts of sodium hydroxide and 200 parts of water. After heating at 175 to 180° for an hour the reaction mass, being at the beginning thinly liquid, becomes very viscous. It is then diluted with water and acidified with hydrochloric acid. The reaction product, which separates in an oily state, becomes crystalline after standing for a longer time. It is identical with the 1-phenylamino-5-hydroxynapthalene-7-sulphonic acid as described in the foregoing examples.

*Example 4*

A mixture of 261 parts of the sodium salt of 1-amino-5-hydroxynaphthalene-7-sulphonic acid, 1100 parts of a sodium bisulphite solution of 1.333 density and 500 parts of 4-methyl-1-aminobenzene is heated in a closed vessel at 130 to 135° for about 48 hours. After the addition of sodiumcarbonate until a slightly alkaline reaction the excess of 4-methyl-1-aminobenzene is distilled off and the remaining liquor is acidified by means of hydrochloric acid and boiled off in order to remove the sulphurous acid. 1-(4'-methylphenylamino)-5-hydroxynapthalene-7-sulphonic acid is obtained in a good yield as nearly colorless crystals cf. the third paragraph of Example 1.

In the same manner by acting with 2-methylaminobenzene, 3-methylaminobenzene, 4-methoxy-1-aminobenzene, 4-phenoxy-1-aminobenzene and 1-naphthylamine respectively the corresponding 1-(2'-methylphenylamino)-5-hydroxynaphthalene-7-sulphonic acid, 1-(3'-methylphenyl)amino-5-hydroxynaphthalene-7-sulphonic acid, 1-(4'-methoxyphenyl)amino-5-hydroxynaphthalene-7-sulphonic acid (cf. paragraph 4 of Example 1), 1-4'-phenoxyphenyl)-amino-5-hydroxynaphthalene-7-sulphonic acid and 1-(1'-naphthyl)-amino-5-hydroxynaphthalene-7-sulphonic acid of the formula:

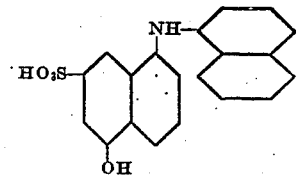

are obtained.

*Example 5*

A mixture of 261 parts of the sodium salt of 1-amino-5-hydroxynaphthalene-7-sulphonic acid, 1100 parts of a sodium-bisulphite solution of 1.333 density and 200 parts of 4-hydroxy-1-aminobenzene-3-carboxylic acid is boiled for a long time under reflux, until the sulphurous acid ester of the 1.5-dihydroxynaphthalene-7-sulphonic acid formed as intermediate is decomposed. The excess of 4-hydroxy-1-aminobenzene-3-carboxylic acid is removed after cooling by filtration. After acidification with hydrochloric acid and removal of the sulphurous acid and in a given case the addition of sodium chloride the 1-(4'-hydroxyl-3'-carboxyphenyl)-amino-5-hydroxynaphthalene-7-sulphonic acid of the formula:

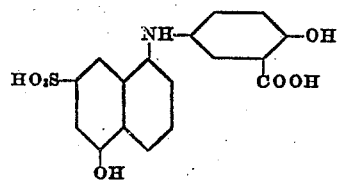

separates as very pure slightly yellowish greenish crystalline substance with an excellent yield. When dry it forms a slightly yellowish greenish powder.

The same reaction product is obtained by heating for about 24 hours a mixture of the sulphurous acid ester of the 1.5-dihydroxynaphthalene-7-sulphonic acid and 4-hydroxy-1-aminobenzene-3-carboxylic acid.

In the same manner by starting from 1-aminobenzene-3-carboxylic acid and from 1-(4'-aminobenzoylamino) - 4 - hydroxybenzene - 3 - carboxylic acid respectively the 1-(3'-carboxy-phenylamino)-5-hydroxynaphthalene-7-sulphonic acid of the formula:

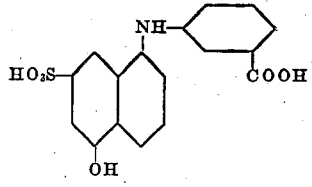

being an almost colorless powder, easily soluble in alkaline solutions and the 4-(5''-hydroxy-7''-sulpho - 1'' - naphthylamino) benzoyl - (4' - hydroxy-3'-carboxyphenyl) amide of the formula:

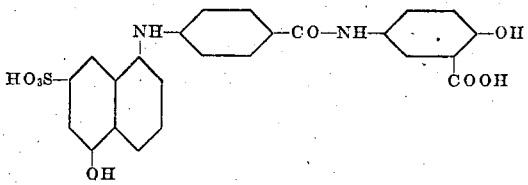

are obtainable.

Example 6

A mixture of 271 parts of the sodium salt of 1 - amino-5-hydroxynaphthalene - 7 - sulphonic acid, 1400 parts of a sodium bisulphite solution of 1.333 density and 180 parts of 4.4'-diaminodiphenyl is heated for about 40 hours in an autoclave at 120 to 125°. When cool the condensation product is isolated. It is diluted with much water, strongly acidified with hydrochloric acid and boiled off, the unchanged 4.4'-diamino-diphenyl being dissolved, whereas the new condensation product remains undissolved. The isolated and dried 1-(4'-aminodiphenyl) amino-5-hydroxynaphthalene-7-sulphonic acid of the formula:

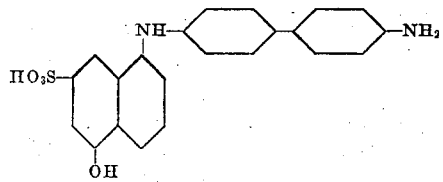

is an almost colorless powder soluble in a dilute sodiumcarbonate solution.

When replacing the 4.4'-diaminodiphenyl by 4-aminodiphenylamine the 1 - (4' - phenylaminophenyl) amino - 5 - hydroxynaphthalene - 7 - sulphonic acid of the formula:

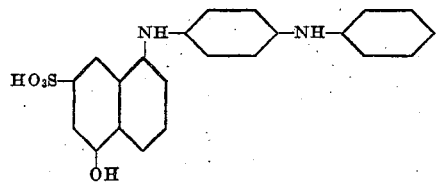

is obtained.

Example 7

261 parts of the sodium salt of 1-amino-5-hydroxynaphthalene-7-sulphonic acid are mixed with 1100 parts of a sodium bisulphite solution of 1.000 density and 220 parts of 1.4-diaminobenzene and the mixture is boiled for about 24 hours under reflux. When cool the formed precipitate is separated by filtration from the bisulphite liquor and extracted with a hot dilute hydrochloric acid. The 1-(4'-aminophenyl) amino-5-hydroxynaphthalene-7-sulphonic acid of the formula:

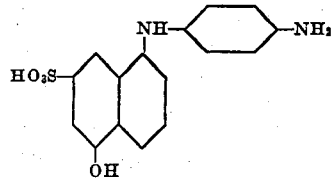

separates in a crystalline form and is when dry a slightly greenish powder soluble in a dilute sodium carbonate solution.

By treatment with acylating agents such as acetic acid anhydride, benzoylchloride or chloroformic acid ethylester in the presence of an acid binding agent the 1 - (4' - acetylaminophenyl) amino-5-hydroxynaphthalene-7-sulphonic acid, the 1-(4'-benzoylaminophenyl) amino-5-hydroxynaphthalene-7-sulphonic acid, 1-(4'-carbethoxyaminophenyl) amino - 5 - hydroxynaphthalene-7-sulphonic acid and similar compounds are formed.

Example 8

A mixture of 261 parts of the sodium salt of 1 - amino - 5 - hydroxynaphthalene - 7 - sulphonic acid, 1100 parts of a sodium bisulphite solution of 1.000 density and 360 parts of 1-aminobenzene-4-thioglycollic acid is boiled for about 48 hours under reflux. When cool the separated initial product is removed by filtration. From the filtrate the sulphurous acid is expelled by boiling with an excess of hydrochloric acid and then the formed 1-(5'-hydroxy-7'-sulpho-1'-naphthylamino)-benzene-4-thioglycollic acid of the formula:

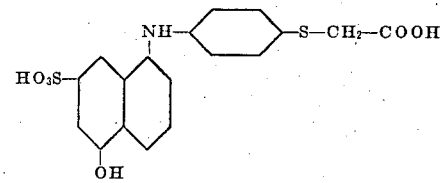

is isolated by adding sodium chloride. It is when dry a slightly grayish powder easily soluble in a dilute sodium carbonate solution.

When replacing the 1-aminobenzene-4-thioglycollic acid by 1-aminobenzene-4-hydroxyacetic acid, 1 - aminobenzene - 4 - aminoethansulphonic acid, 1 - aminobenzene-4-aminoacetic acid or 1-amino-4-oxalyl-aminobenzine the corresponding products of the formulae:

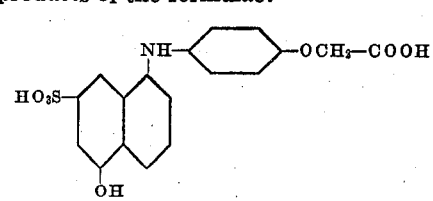

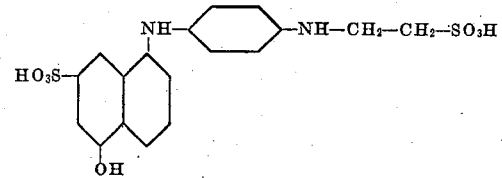

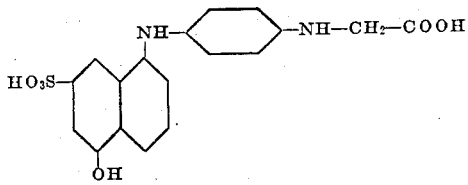

and

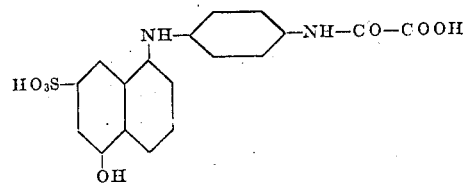

respectively are formed.

Example 9

A mixture of 261 parts of the sodium salt of 1-amino - 5 - hydroxynaphthalene - 7 - sulphonic acid, 1100 parts of a sodiumbisulphite solution of 1.333 density and 500 parts of 4,4'-diaminodiphenylamino-2-sulphonic acid is boiled for about 24 hours under reflux. The formed condensation product of the formula:

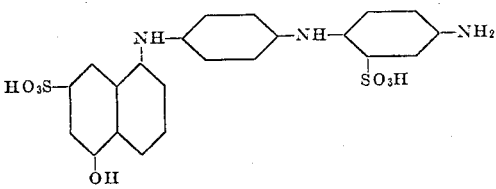

is when dry a slightly grayish powder easily soluble in a dilute sodiumcarbonate solution.

Example 10

239 parts of 1-amino-5-hydroxynaphthalene-7-sulphonic acid are mixed with 500 parts of water and 40 parts of sodium hydroxide and 875 parts of a sodium bisulphite solution of 1.333 density are added. Then the mixture is heated while stirring for about 35 to 40 hours in an autoclave at 125 to 130°.

After acidification with hydrochloric acid the sulphurous acid is removed by boiling and, if necessary, a little amount of undecomposed starting material is removed by adding sodium chloride to the aqueous solution.

By evaporisation under a slightly reduced pressure the 1,1'-dinaphthylamino-5,5'-dihydroxy-7,7'-sulphonic acid of the formula:

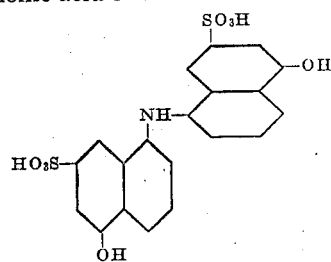

is obtained as a slightly greenish gray powder, very easily soluble in water and alkaline solutions.

We claim:

1. 1-arylamino - 5 - hydroxynaphthalene-7-sulphonic acids of the general formula:

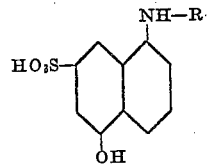

wherein R stands for a radicle of the group consisting of phenyl, alkyl-phenyl, alkoxy-phenyl, phenoxy-phenyl, carboxy-phenyl, carboxy-hydroxy-phenyl, hydroxy-carboxy-N-phenyl carbamyl-phenyl, amino-diphenyl, phenylamino-phenyl, aminophenyl, acetylaminophenyl, benzoylaminophenyl, carbethoxyaminophenyl, carboxymethylenethiophenyl, carboxymethyleneoxyphenyl, sulphoethyleneaminophenyl, carboxymethyleneaminophenyl, oxalylaminophenyl, and sulphodiamino-phenyl-N-phenyl, which products are when dry colorless to slightly reddish to greenish gray powders, which are easily soluble in alkaline solutions and mostly soluble in hot water, the alkali metal salts of which are easily soluble in water and can be isolated from aqueous solutions in most cases by adding salt thereto.

2. The 1 - (4' - methoxyphenylamino) - 5 - hydroxynaphthalene-7-sulphonic acid of the formula:

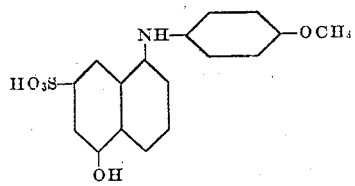

being a slightly colored powder easily soluble in alkaline solutions, the sodium salt crystallizing as slightly greenish leaflets.

3. The 1 - (3' - carboxyphenyl) - amino-5-hydroxynaphthalene-7-sulphonic acid of the formula:

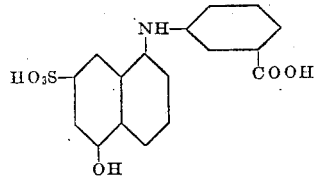

being an almost colorless powder, easily soluble in alkaline solution.

4. The 1-(4'-aminodiphenyl)-amino-5-hydroxynaphthalene-7-sulphonic acid of the formula:

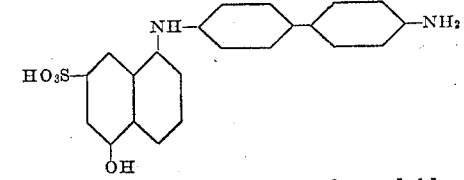

being an almost colorless powder soluble in a dilute sodium carbonate solution.

RICHARD FLEISCHHAUER.
ADOLF MÜLLER.